May 22, 1945.  A. L. FORBES, JR  2,376,765
PRESSURE PIPE-WELDING
Filed May 25, 1942  5 Sheets-Sheet 1

INVENTOR
Arthur L. Forbes Jr.
By
E. V. Hardway
Attorney

May 22, 1945. A. L. FORBES, JR 2,376,765
PRESSURE PIPE-WELDING
Filed May 25, 1942 5 Sheets-Sheet 4

INVENTOR.
Arthur L. Forbes Jr
By
E. V. Hardway
ATTORNEY

May 22, 1945.　　　A. L. FORBES, JR　　　2,376,765
PRESSURE PIPE-WELDING
Filed May 25, 1942　　　5 Sheets-Sheet 5

INVENTOR.
Arthur L. Forbes Jr.
BY　E. V. Hardway.
ATTORNEY.

Patented May 22, 1945

2,376,765

UNITED STATES PATENT OFFICE 2,376,765

PRESSURE PIPE-WELDING

Arthur L. Forbes, Jr., El Paso, Tex.

Application May 25, 1942, Serial No. 444,459

22 Claims. (Cl. 78—84)

This invention relates to the art of pressure butt-welding; and more especially it concerns apparatus for the pressure butt-welding of tubular members of weldable metal. It has especial utility for the butt-welding of pipes in connection with the laying of overland pipe lines commonly used for the transportation of hydrocarbon oils and gas. The oxy-acetylene or other gas welding process preferably is used for supplying the welding heat, in conjunction with welding operations wherein the abutting surfaces of the members being welded are maintained under pressure during a welding operation conducted at a temperature substantially below the fusion point of the metal. A welding process of this type is disclosed in United States Patent No. 2,231,027 of O. Renner, Jr.

Heretofore, in the production of welded pipe lines, it has been common practice to bring the ends of the pipes into abutting relation and to weld the abutting ends together by means of a fusion welding operation, utilizing oxy-fuel gas welding flames in conjunction with filler metal supplied from a welding rod or the like. Such welding procedures are relatively slow and laborious and are subject to numerous disadvantages. Recently, processes have been developed for welding pipe wherein the ends of the pipes to be joined are forced together in intimate surface-to-surface contact, and are then welded together by the application of welding heat from flames surrounding the members adjacent the abutting ends, the welding being conducted at temperatures below the fusion temperature of the metal. The resultant welded joint has outstandingly high strength and toughness not normally encountered in fusion welded joints. The commercial exploitation of such procedures in laying long pipe lines heretofore has been somewhat hampered because of the fact that, during transportation of the pipe to the site of the welding operation, the ends of the pipe often became injured in handling so as to render the same out of round. It therefore has been necessary manually to reshape the ends of such pipes in the field to insure the intimate surface-to-surface contact of the abutting ends during the welding operation, since without such intimate contact, oxides formed on the parts out of contact upon application of welding heat are later occluded in the welded joint and materially reduce the strength and other desirable qualities of such joint.

Among the more important objects of the invention are to provide novel pressure butt-welding apparatus especially designed for welding together lengths of metal pipe in the construction of pipe lines; to provide in such welding apparatus means for reshaping the opposed ends of the pipes being welded so that the said ends of the pipes will be substantially round or will have identical contours during the welding operation; to provide novel apparatus which may readily be applied to adjacent ends of pipes to be welded and which will securely grip and maintain such members in exact alignment and in intimate surface to surface contact while under a selected pressure during a welding operation, and will facilitate the uniform welding of the abutting ends to form a welded joint of high quality; and to provide novel, readily portable pressure butt-welding apparatus which may be supported from a carrier adapted to travel alongside the pipe line as the work progresses.

In practice, it is sometimes more convenient to weld a number of sections together before they are brought into position to be welded into the line and, in such case, a selected number of sections are welded together and then brought, as a unit, into alignment with the line and welded thereto. The machine herein described has been designed for the purpose of efficiently carrying out the above mentioned process of welding a single section or a plurality of welded-together sections into the line.

Another object of the invention is to provide a novel type of machine which may be readily applied to the line and to the section to be welded into the line, which will securely grip and hold the line and the section to be added in exact alignment and which includes a welding torch, or other heat supplying means, for supplying sufficient heat to the abutting ends of the line and the section to be added to bring the same to a welding temperature, said machine also including means which may be manipulated to suddenly increase the pressure of the ends against each other to accelerate the welding together of said abutting ends.

It is another object of the invention to provide, in a pressure pipe welding machine of the character described, a welding torch or other means for applying sufficient heat to the abutting ends of the line and the section to be added to accomplish the welding process, which torch, or heat applying means, is reciprocable longitudinally of the pipe across the abutting ends and is adjustable circumferentially about said abutting ends so that the heat applied will be evenly distributed across the joint and around said ends to cause a uniform weld.

The apparatus includes means for supporting the various clamping, pressure-applying, and heating elements and for maintaining the same in alignment upon pipes being welded together during a pressure welding operation.

The machine may be suspended from the boom of a carrier adapted to travel alongside the line, whereby the machine may be readily moved along as the work progresses, and thus maintained in readiness for application to the work; however, other selected means for supporting and moving the pressure pipe welding machine along the pipe and for applying it to and retracting it from the pipe, may be employed.

With the above and other objects in view, the invention has particular relation to certain novel features of construction, operation and arrangement of parts, an example of which is given in this specification and illustrated in the accompanying drawings, wherein.

Referring to the drawings, like numerals of reference designate the same parts in each of the figures.

Figure 1:
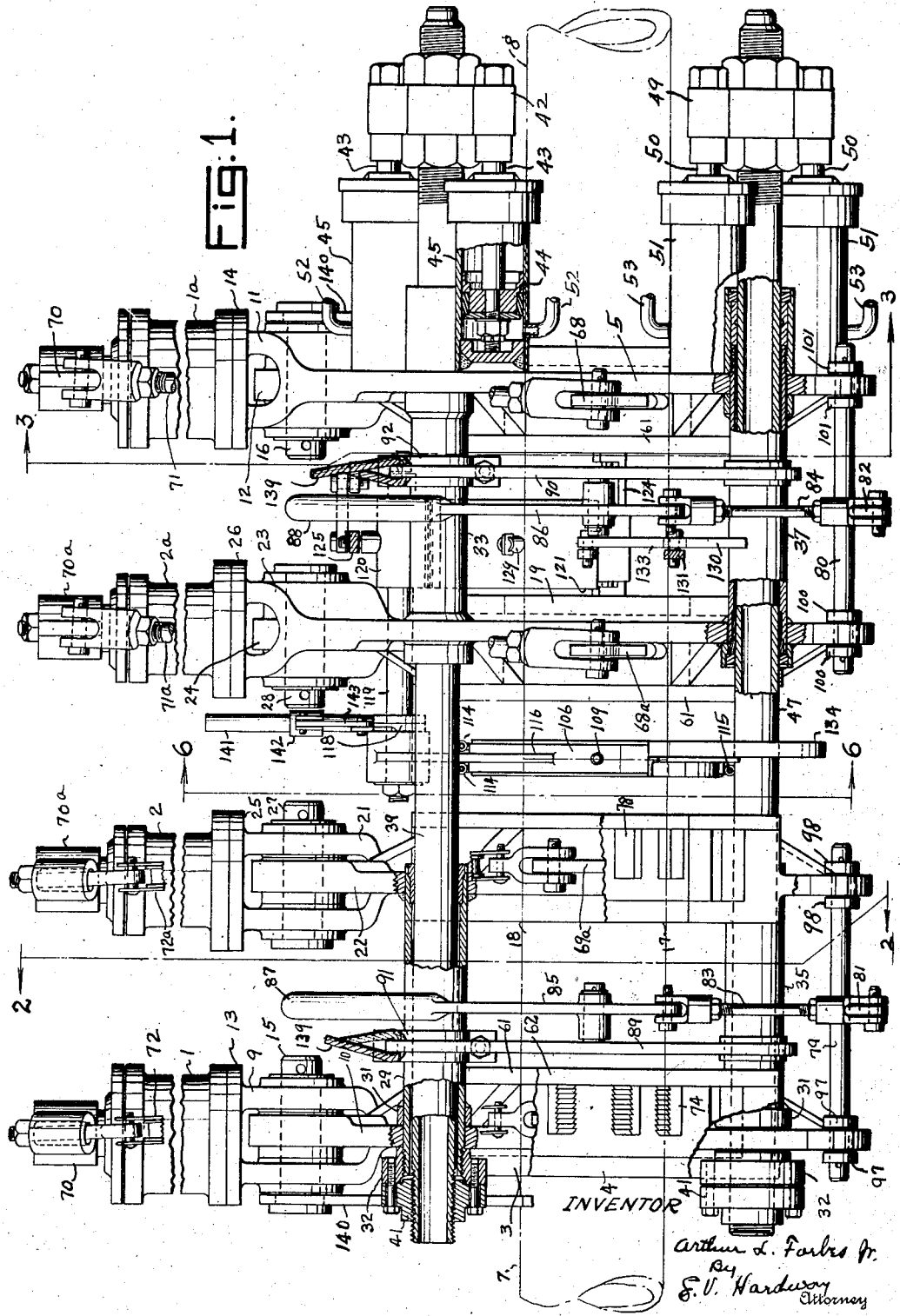
Figure 1 shows a side elevation of the machine, partly in section, as applied to the work.
Figure 2:
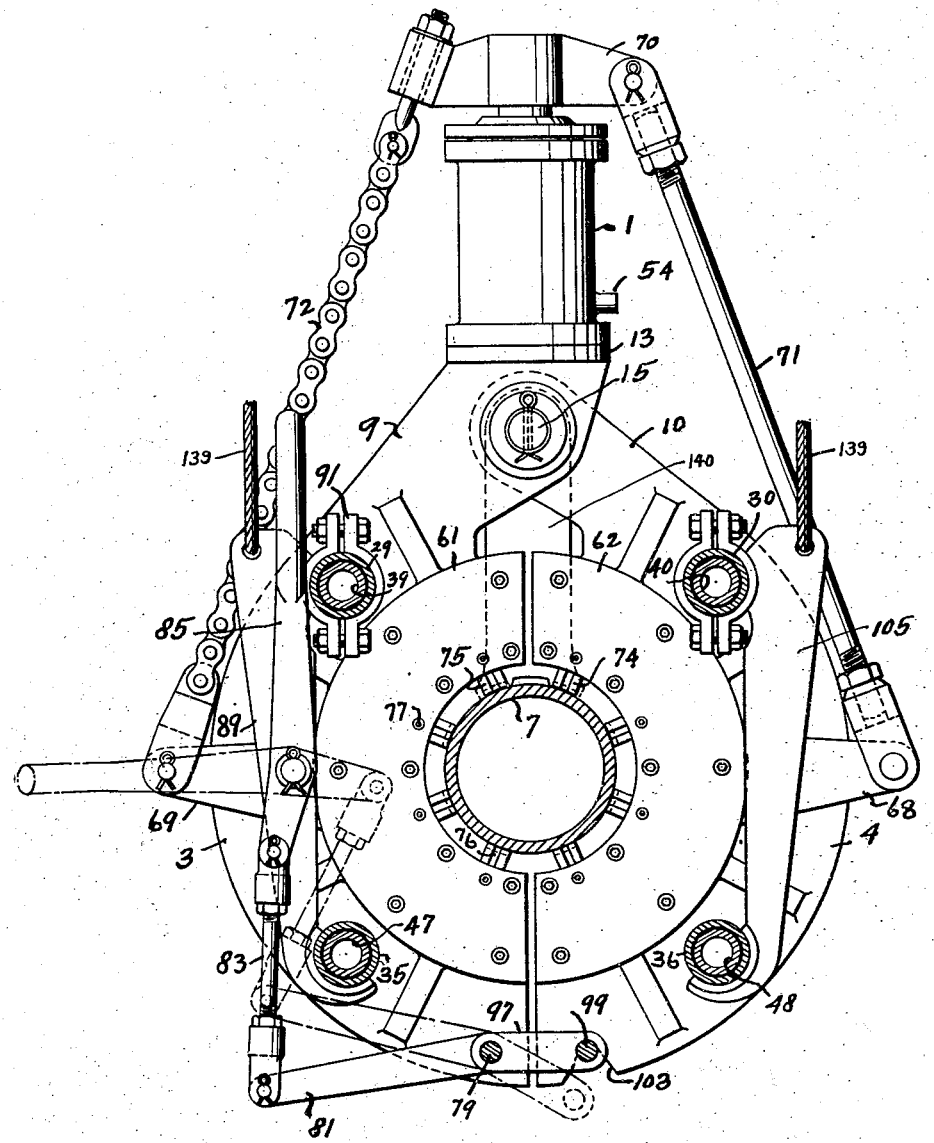
Figure 2 shows a vertical, sectional view taken on the line 2—2 of Figure 1, looking in the direction of the arrows.
Figure 3:
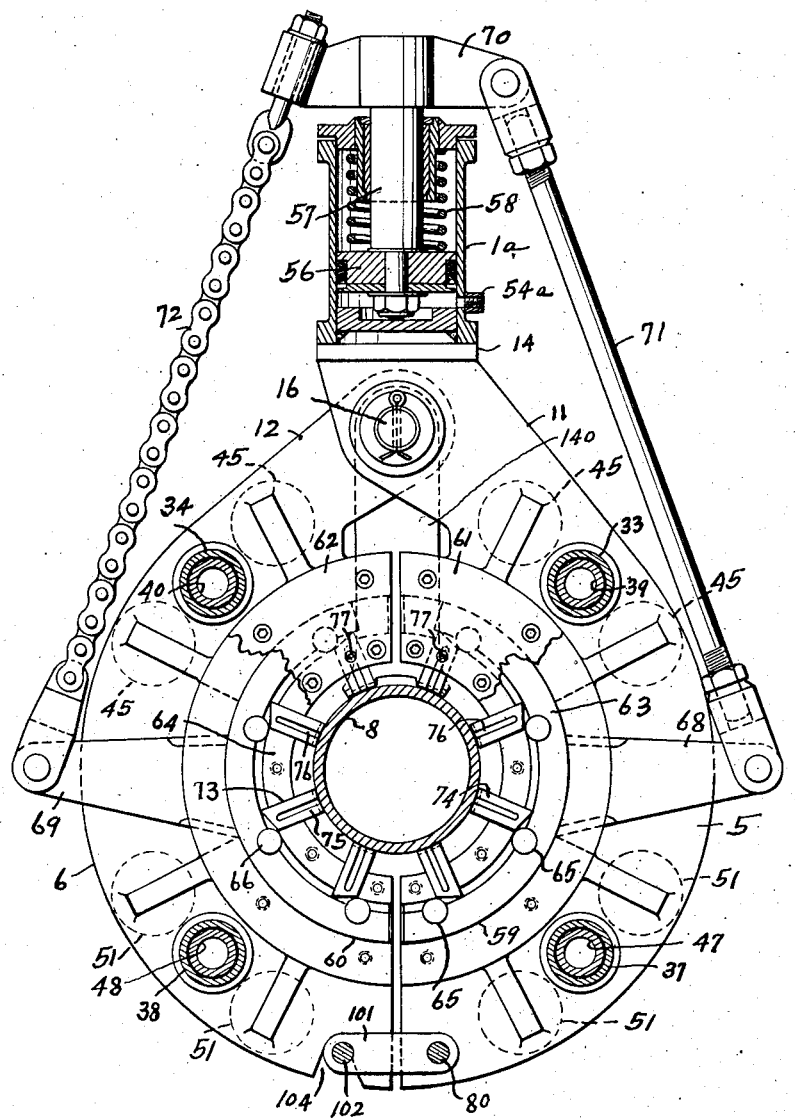
Figure 3 shows a vertical, sectional view taken on the line 3—3 of Figure 1, looking in the direction of the arrows.
Figures 4, 5:
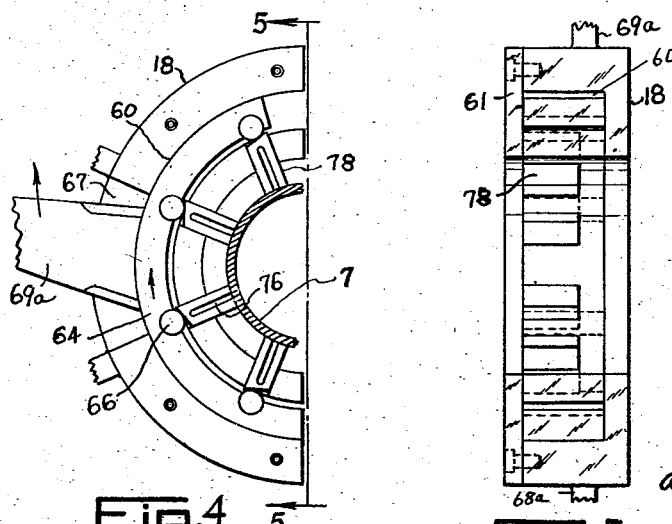
Figure 4 shows a fragmentary, cross-sectional view, showing a pipe re-shaping clamp.
Figure 5 shows a cross-sectional view taken on the line 5—5 of Figure 4, looking in the direction of the arrows.

For aligning the pipes to be welded and for re-shaping the end portions thereof to insure intimate surface-to-surface contact of all parts of the abutting ends during the welding operation, there are provided the fluid pressure cylinders 1, 1a and the fluid pressure cylinders 2, 2a, as shown in Figure 1; also, there are two pairs of pipe gripping clamps and two pairs of pipe re-shaping clamps. The pipe gripping clamps are designated by the numerals 3, 4 and by the numerals 5, 6, respectively, as shown in Figures 2 and 3. These clamps are arcuate and complementary so as to conform to the shape of and to surround the aligned sections of pipe to be welded together. As illustrated, the numeral 8 indicates the permanent line of pipe and the numeral 7 refers to the pipe section to be welded to the pipe 8. These clamps have the extended shanks 9, 10 and 11, 12, respectively. The shanks 9, 11 terminate at their upper ends in circular flanges 13, 14 on which the cylinders 1, 1a, respectively, are mounted and secured in any preferred manner and beneath said flanges the shanks 9, 11 have suitable openings to receive the ends of the corresponding shanks 10, 12, as shown in Figures 2 and 3, and these shanks are pivoted together by means of suitable pivot pins 15, 16 so that the clamps may open and close. The pipe re-shaping clamps are designated by the numerals 17, 18 and 19, 20, respectively. They are similar in shape to the corresponding clamps 3, 4, 5 and 6. They have the extended shanks 21, 22 and 23, 24, respectively, the shanks 21 and 23 terminating, at their upper ends, in the circular flanges 25, 26 to support the cylinders 2, 2a which are secured thereon in any preferred manner and beneath said flanges 25, 26, the shanks 21, 23 having openings to receive the upper ends of the shanks 22, 24, which are pivoted therein by means of the respective pivot pins 27, 28 so that said clamps may be opened and closed; all as shown in Figure 1. There are the upper bearing sleeves 29, 30, the former of which is extended through the clamps 3 and 18 and the latter of which is extended through the clamps 4 and 17, as shown in Figure 2, said sleeves being secured in any preferred manner to said clamps 17 and 18, as by welding, as indicated in Figure 1. They may be secured to the clamps 3 and 4 as shown in Figure 1, by means of the annular abutments such as 31, welded around the sleeves on one side of said clamps and by the flange nuts 32 screwed onto the ends of said sleeves on the opposite side of the respective clamps. There are also the upper sleeves 33, 34 extended through and secured to the respective clamps 5, 6 and 19, 20. These sleeves are secured to their respective clamps in the same manner as the sleeves 29, 30. The sleeves 29, 33 are in alignment and likewise the sleeves 30, 34. There are the lower bearing sleeves 35, 36, the former of which extends through the clamps 3 and 18 and the latter of which extends through the clamps 4 and 17. These lower bearing sleeves are fastened to their respective clamps in the same manner as the upper bearing sleeves 29, 30. There are also the lower bearing sleeves 37, 38 extended through the clamps 5, 19 on one side and through the clamps 6, 20 on the other side, said bearing sleeves 37, 38 being secured to their respective clamps in substantially the same manner as the bearing sleeves 33, 34, as clearly illustrated in Figure 1. The bearing sleeves 35, 37 are in alignment and likewise the bearing sleeves 36, 38 are in alignment. A tubular pull rod 39 is extended through the bearing sleeves 29, 33 and a tubular pull rod 40 is extended through the bearing sleeves 30, 34 as shown in Figures 1 and 3. These rods have flange nuts as 41 threaded onto one end thereof and bolted to the corresponding flange nuts 32, as shown in Figure 1, and fastened to their other ends, in any suitable manner, are the transverse yokes as 42. Extended through the aligned lower bearing sleeves 35, 37 and 36, 38, respectively, are the tubular pull rods 47, 48. These pull rods are anchored at one end to the corresponding flange nuts 32 by means of the nuts 41 which are threaded thereon and bolted to said flange nuts 32, as shown in Figure 1. Attached to the other ends of the pull rods 47, 48 are the transverse yokes 49. The inner sides of the clamps 3, 4 and of the clamps 5, 6, have the arcuate guides as 59 and 60. The outer sides of said guides being formed by the arcuate plates 61, 62 which are bolted to the sides of the clamps all as clearly shown in Figures 2 and 3. Located in these guides are the arcuate carriers 63, 64, mounted in the inner sides of which are the roller bearings 65, 66. Attached to said carriers and extended outwardly therefrom through the diverging slots as 67 are the arms 68, 69. In the cylinders 1, 1a and 2, 2a are the plungers 56 which are attached to the inner ends of the plunger rods 57 as shown in Figure 3. These plungers 56 are normally returned to their lower, or inactive, positions by means of coil springs as 58 which surround the plunger rods 57 and are interposed between the plungers and cylinder heads as also indicated in Figure 3. As shown in Figures 1 and 3, the outer ends of the plunger rods 57 of the cylinders 1, 1a carry the respective transverse yokes 70. As shown, the free ends of the arms 68, 69 are connected to the free ends of the corresponding yoke 70, one by the connecting rod 71 and the other by the flexible tie member such as a chain 72. However, either rods or chains may be employed for making these connections. Movable in radial slots, as 73, in the respective clamps 3, 4 and 5, 6, are the pipe gripping jaws 74, 75 whose outer ends bear against the corresponding roller bearings 65, 66 and are oppositely pitched as shown in Figure 3. The inner ends of these pipe gripping jaws have forwardly pitched teeth to engage the pipe section 7 and the pipe line 8, respectively, as shown in Figure 1. The outer ends of the jaws 74, 75 are so pitched that when the arms 68, 69 are pulled upwardly, the jaws 74, 75 will be forced inwardly into secure engagement with the pipe line and the section to be added thereto, respectively. An operating fluid under pressure may be introduced, through a flexible line, into the cylinders 1, 1a through the line connections 54, 54a, as shown in the Figures 2 and 3, and the arms 68 and 69 actuated and the pipe engaging jaws 74, 75 forced inwardly into secure engagement with said pipe line and with the pipe section to be added thereto. It will be noted from an inspection of Figures 2 and 3 that these pipe engaging jaws 74 and 75 each have a longitudinal keyway 76 extended from the inner ends thereof and terminating near the outer ends thereof. Keys as 77 are screwed through the plates 61, 62 with their inner ends projecting into said keyways. These keys limit the radial inward movement of the pipe engaging jaws as shown in Figure 3. The pipe re-shaping clamps 17, 18 and 19, 20 are of substantially the same construction as the pipe gripping clamps. Instead of the gripping jaws, however, they have the radially movable re-shaping members 78 mounted for inward radial movement therein, as illustrated in Figures 4 and 5. The mechanism for actuating these re-shaping members is the same as that hereinbefore described for actuating gripping jaws 74, 75. Fluid under pressure may be introduced, through a flexible line, into the cylinders 2, 2a through line connections such as 55a, shown in Figure 6 to force the plungers in these cylinders outwardly and thereupon the re-shaping members 78 will be actuated inwardly into contact with the abutting ends of the pipes, through the instrumentality of the connecting rods 71a and the flexible connecting members, or chains, 72a, which are connected to the outer ends of the actuating arms 68a, 69a, and to the free ends of the respective yokes 70a, 70a mounted on the outer ends of the plunger rods 57 of the cylinders 2, 2a. However, either rods or chains may be used interchangeably.

As will be seen from the foregoing, the machine, as assembled, and in a preferred embodiment, as shown, is composed of two halves of sections connected to pivot about the axis of the pins 15, 16, 27, 28 and as shown in Figures 1, 2, 3, and 6. One half, or section, is composed of the clamps 3, 5, 18 and 19 maintained in alignment by the upper sleeves 29, 33 and the lower sleeves 35, 37 with the upper and lower pull rods 39, 47 extending through these respective upper and lower sleeves. The other half, or section, is composed of the clamps 4, 6, 17 and 20 maintained in alignment by the upper sleeves 30, 34 and the lower sleeves 36, 38 with the upper and lower pull rods 40, 48 extending through these respective upper and lower sleeves so that the halves or sections of the machine may move as units into operative position around the pipes or into retracted or open position.

For forcing the abutting ends of the pipes together under high pressure during the welding operation, there are provided on each side the pairs of upper cylinders 45, 45 and the pairs of lower cylinders 51, 51 which are attached to the respective clamps 5, 6 as indicated in Figure 1, and as also indicated in dotted lines in Figure 3. In the cylinders 45, 45, are the corresponding plungers 44, 44 and in the cylinders 51, 51 are similar plungers. Plunger rods 43, 43 and 50, 50 are provided. The outer ends of the plunger rods 43 are connected to the yoke 42 and the outer ends of the plunger rods 50 are connected to the yoke 49, as illustrated in Figure 1. An operating fluid under pressure may be introduced into the cylinders 45, 45 in front of the plungers therein, through the lines 52, 52 and similarly an operating fluid under pressure may be introduced into the cylinders 51, 51 in front of the plungers therein through the lines 53, 53, all as shown in Figure 1. Upon application of fluid under pressure into the cylinders 1, 1a and 2, 2a, the arms 68, 69 and 68a, 69a will be correspondingly actuated to force the pipe gripping jaws 74, 75 and the radially movable re-shaping members 78 into engagement with the pipe. The jaws 74, 75 will securely grip the pipe and the pipe section to be added and the members 78 will center and align the same and will also restore the adjacent ends of the pipe line and section to be added to a substantially round shape, if they have been deformed, so that the said ends will perfectly register when they are brought together. Simultaneously with the application of fluid under pressure to the cylinders 1, 1a and 2, 2a, or immediately thereafter, the fluid under pressure may be supplied to the cylinders 45, 45 and 51, 51 to move the pistons therein outwardly thus moving the clamps 3, 4 toward the clamps 5, 6. The abutting ends of the pipe will thus be forced firmly together and their end surfaces held in intimate contact.

For applying welding heat to the outer peripheral surfaces of the pipe at and adjacent the abutting ends, a gas welding torch has been provided. However, other means for heating the adjacent ends of the pipe may be used if desired. This welding torch is illustrated in detail in Figures 6, 7 and 8. It embodies a head composed of arcuate complemental sections 106, 107. These sections have the channels 108, connected into which are the inlet gas connections 109, 110 for supplying gas thereto and leading from which are the radial welding tips 111, 112 which project radially inwardly and which entirely surround the pipe when the torch is in action. Each section of the head also has circulating channels as 113, 113 leading around from end to end thereof into which a cooling fluid may be supplied through the inlet pipes 114 and discharged therefrom through the outlet pipes 115 for cooling the sections 106, 107. The gas supply pipes and the pipes for the conduct of the cooling fluid have flexible connections to allow the sections 106, 107 to be opened for removal from the pipe and closed around the pipe. The sections 106, 107 have the hinge members 116, 117 attached thereto and which are pivotally connected to the corresponding ends of a transverse yoke 118, which is carried by the inner end of a rod 119.

Figure 6:
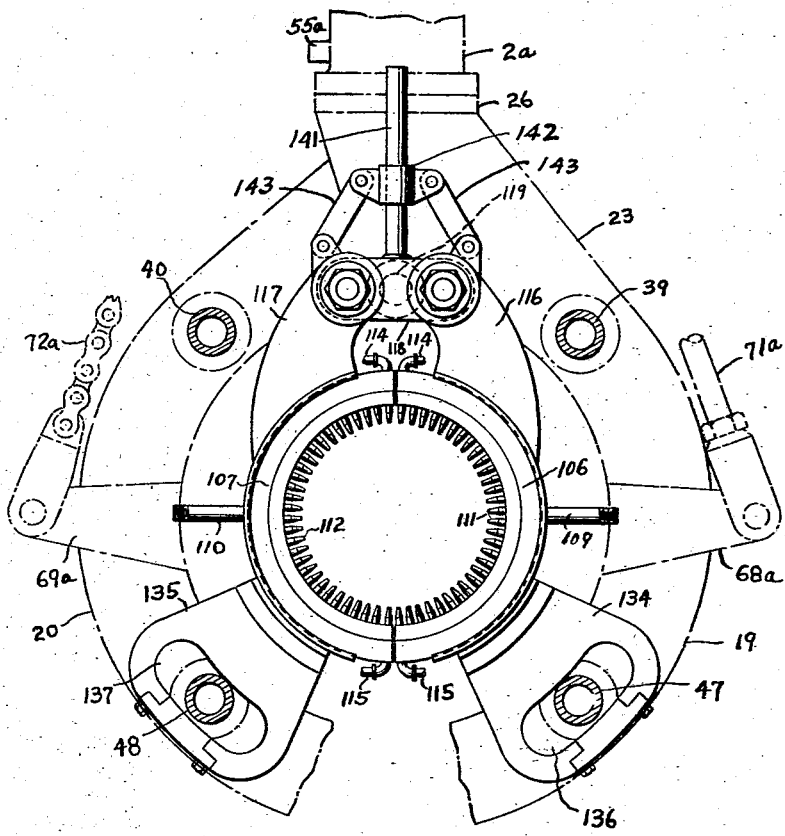
Figure 6 shows a cross-sectional view taken on the line 6—6 of Figure 1, looking in the direction of the arrows.
Figure 7:
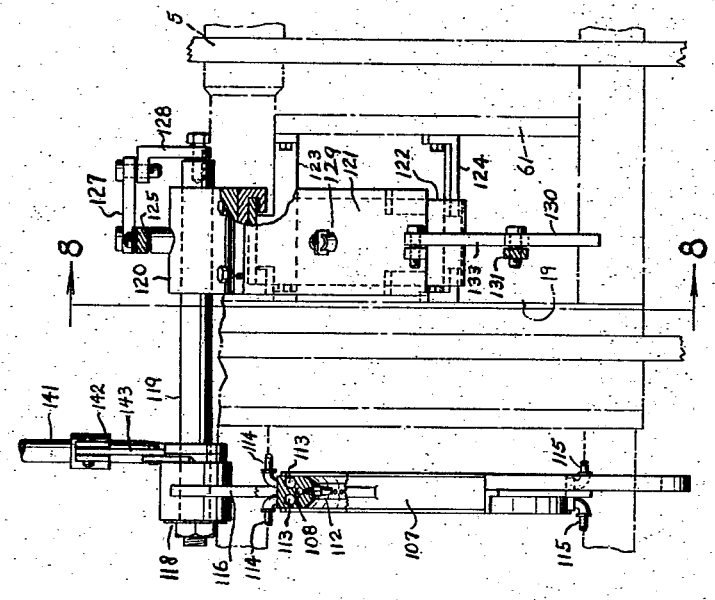
Figure 7 shows a fragmentary, side elevation of the welding torch and associated parts, partly in section.
Figure 8:
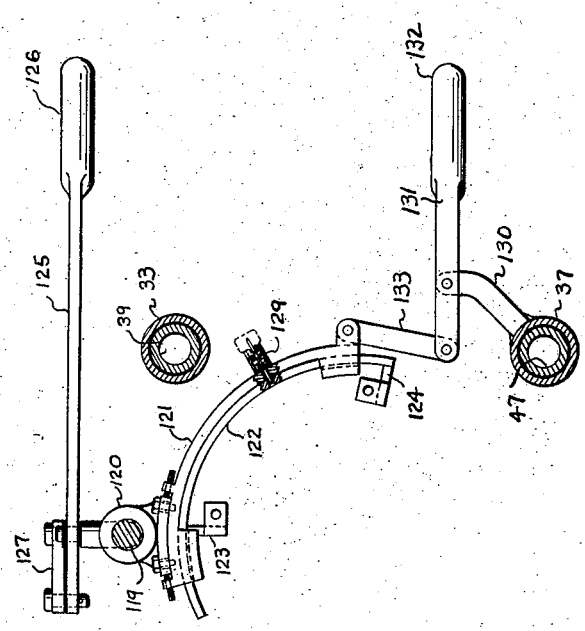
Figure 8 shows a fragmentary, cross-sectional view taken on the line 8—8 of Figure 7, looking in the direction of the arrows

For reciprocating the heating means longitudinally of the pipe across the abutting ends, and for oscillating the heating means peripherally of the pipes at the abutting ends, the outer end of the rod 119 is slidable in a bearing 120 which, in turn, is mounted on an adjustable frame 121. This frame is arcuate in form and has a dovetailed connection with a correspondingly shaped bracket 122, located between the clamps 5 and 19. This bracket is supported by the supporting bars 123, 124 whose ends are attached to the clamps 5 and 19, respectively. The bracket 122 is concentric with the pipe, when the machine is mounted on the pipe. Pivotally mounted on the bearing 120, there is a control lever 125, one end of which is formed with a hand grip 126 and the other end of the lever is pivoted to one end of the adjusting link 127, the other end of this link being pivotally connected to the upstanding bracket 128, which is connected to the control rod 119. By manipulating the lever 125, therefore, the rod 119 and the torch may be adjusted longitudinally of the pipe surrounded by the said torch. This adjustment is desirable so that the flames from the tips 111, 112 may be moved back and forth with relation to the abutting ends of the pipe to be welded so that a sufficient area of the pipe may be brought to the required temperature to effect a secure weld. As hereinabove stated, the frame 121 is movable back and forth along the bracket 122. This adjustment of the frame will cause a corresponding movement of the welding torch back and forth circumferentially about the ends of the pipe being welded so that the flames from the tips 111, 112 may be made to play on the abutting ends of the pipe uniformly all the way around. The bracket 122 may be latched against movement on the frame 121 by means of the releasable, spring actuated, latch 129. For adjusting the frame 121, an arm 130 is secured to and upstands from the bearing sleeve 37 and to the upper end of this arm the adjusting lever 131 is pivoted. One end of this lever is formed with a hand grip 132 and its other end is pivoted to the lower end of the link 133. The upper end of this link is pivoted to the adjacent end of the frame 121. By this means the frame 121 and the welding torch may be adjusted, as desired, about the pipe for the purpose stated. As shown in Figure 6, the sections 106, 107 have the outwardly extended wings 134, 135 provided with elongated arcuate slots 136, 137 through which the respective pull rods 47, 48 extend, said slots allowing the described circumferential movement of the torch. After the weld has been completed and the pipe-aligning and reshaping means, the end-pressure applying means and the welding torch, or other heating means, are being retracted and removed from the pipe, it is desirable that the yoke 118 and the hinges, for pivotally connecting the sections of the torch head to said yoke, be maintained in approximately horizontal position. Means have been provided for this purpose as shown in Figures 1, 6 and 7. This guide means comprises an upstanding guide post 141 on which a guide sleeve 142 is slidably mounted. This guide sleeve is connected to the upper ends of the hinge members 116, 117 by means of similar links 143, 143, which are pivotally connected to lateral ears on the sleeve 142 and to similar ears on the upper ends of the hinge members 116, 117. The post is anchored to and upstands from the yoke 118. This arrangement causes the sections 106, 107 of the torch head to move in unison.

Provision has been made for releasably locking the respective pipe aligning and re-shaping means and pressure applying means in operative position during the welding operation as is more particularly shown in Figures 1, 2 and 3, and which will now be described. Rotatably mounted in suitable aligned bearings in the free ends of the clamps 3, 18 is the rod 79, and mounted in similar aligned bearings in the free ends of the clamps 5 and 19 is the rod 80, as shown in Figures 1 and 2. Rigidly secured to these rods are the respective levers 81, 82. There are the links 83, 84 pivotally connected at their lower ends to the outer ends of the levers 81, 82 and pivotally connected at their upper ends to the adjacent ends of the hand levers 85, 86, as best illustrated in Figure 2. The upper ends of these last mentioned levers have the grips 87, 88 for manipulating them and these levers 85, 86 are pivotally connected, at immediate points, to corresponding hanger plates 89, 90 also as shown in Figures 1 and 2. The upper ends of these hanger plates are clamped to the bearing sleeves 29, 33 by the clamps 91, 92. There are the pairs of arms 97, 97 and 98, 98, respectively, which are rigidly attached at one end to the rod 79 and whose other ends carry the latch rod 99, as shown in Figures 1 and 2, and there are the pairs of arms 100, 100 and 101, 101 rigidly attached at one end to the rod 80 and whose other ends carry the latch rod 102, as shown in Figure 3. These latch rods 99 and 102 are arranged to be seated, or latched, in the seats 103 and 104, respectively, of the opposing clamps, as shown in Figures 2 and 3, when the clamps are latched together. The latches above referred to may be operated into latched, or released, positions, by manipulating the corresponding hand levers 85, 86. When these hand levers are moved into horizontal position, as indicated in dotted lines in Figure 2, the corresponding ends of the levers 81, 82 will be elevated and the corresponding latch rods 99, 102 will be moved out of their corresponding notches 103, 104 thus releasing the clamps and permitting them to be opened and thus released from the pipe. When the hand levers 85, 86 are moved upwardly into vertical positions as shown in full lines in Figure 2, the latch rods will be moved by the corresponding arms 97, 98 and 100, 101 up into the notches 103, 104, thus latching the clamps together around the pipe as shown in full lines in Figures 1 and 2.

Means have been provided for concurrently positioning the welding apparatus upon the pipes adjacent the abutting ends and for causing the sections of the respective aligning means, end pressure applying means and heating mechanism to move into operative position around the pipes adjacent such abutting ends. For this purpose, the apparatus is provided with supporting legs 140, 140, which depend from the pins 15, 16 as shown in Figures 1 and 3. Upon contact of the machine with the pipes, the supporting legs 140, 140 will first land on the pipes and they will support the machine on the pipes and the pipe gripping clamps and the pipe reshaping clamps and the sections of the torch head will then close around the pipes and the said clamps may then be latched, or locked, around the pipe line 8 and the additional pipe section 7 to be welded thereto.

Opposite the hanger plates 89, 90 are similar hanger plates 105, 105, one of which is shown in Figure 2. These hanger plates 105 are clamped to the bearing sleeves 30, 34, as is shown in Figure 2. The free ends of the hanger plates 89, 90 are also attached to the bearing sleeves 35, 37, and the free ends of the hanger plates 105, 105 are also attached to the bearing sleeves 36, 38 in a manner indicated in Figure 2, thus bracing the structure and forming secure anchorage for lifting cables 139. These cables are attached to the hanger plates on opposite sides of the pivot pins 15, 16, and 27, 28, about which the two halves or sections of the welding machine pivot so that when the latch is released and an upward pull is exerted on the cables 139, the respective sections of the pipe aligning and re-shaping means, the end pressure applying means and the heating means will be retracted from the welded joint after completion of a welding operation.

Figure 9:
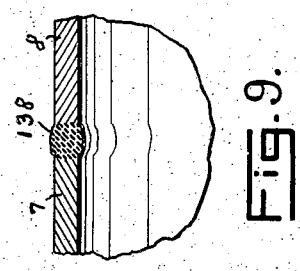
Figure 9 shows a fragmentary, longitudinal sectional view of the pipe showing the weld.

In operation the machine, in the form illustrated, may be swung from the boom of a tractor designed to travel alongside the pipe line. When it is desired to position the welding apparatus upon the pipes adjacent the abutting ends, the machine may be lowered and upon contact of the machine with the pipe, the supporting legs 140, 140 will land on the pipe as hereinabove stated and as shown in Figures 1 and 3, and will stop the downward movement of the machine and the pipe gripping clamps and pipe re-shaping clamps and the sections of the torch had will close around the pipe and said clamps may be latched or locked into position around the pipe. Fluid under pressure may then be admitted into the cylinders 1, 1a and 2, 2a to force the clamp jaws 74, 75, and the re-shaping members 78 into contact with the pipes for the purposes hereinabove explained and upon application of fluid under pressure into the cylinders 45, 51, the abutting ends of the pipes will be forced firmly together with their end faces in intimate contact. The pressure admitted to the cylinders 45, 51 may be initially approximately 150 lbs. per square inch and the heat applied to the abutting ends of the pipe may be approximately 2,000° F.; meanwhile the welding torch may be moved as hereinabove stated, back and forth longitudinally of the pipe across the joint and may also be moved back and forth circumferentially about said abutting ends. After a time, additional fluid under pressure may be admitted to the cylinders 45, 51 to increase the pressure therein to about 450 lbs. per square inch thus causing a further movement of the pipe section 7 toward the line 8. The additional pressure thus set up and the additional friction between said abutting ends will cause sudden increase in temperature causing said ends to weld together thus forming the weld 138 as shown in Figure 9. When the weld has been completed, the pressure may be relieved from the cylinders 1, 1a and 2, 2a and the latches securing the clamps 3, 4, 5, 6 around the pipe may be released allowing said clamps to swing apart around the pins 15, 16, 27, 28 and open so as to release the pipes. As the machine is lifted from the pipe, the lifting cables 139 will cause the clamps to swing outwardly and the pull rods 47, 48 will engage with the slotted wings 134, 135 to swing the torch head sections 106, 107 open or away from the pipe so that the machine may be elevated clear of the pipe and readily moved along the line forwardly as a unit to the point where the next weld is to be made.

The drawings and description are illustrative merely while the broad principle of the invention will be defined by the appended claims.

What I claim is:

1. Apparatus for welding together the ends of tubular members of weldable metal under high pressure, which comprises sectional means for longitudinally aligning said members and for re-shaping the ends thereof, and for continuously maintaining the opposed ends in abutting relation during a welding operation; sectional means for applying high pressure to the abutting ends of said members while thus aligned; sectional torch means for directing welding flames upon the outer peripheral surfaces of said members at and adjacent said abutting ends; and means operative upon contact thereof with the tubular members being welded for causing movement of the respective sections of each of said sectional means from a retracted position laterally of the tubular members into operative position surrounding the tubular members preparatory to a welding operation.

2. Apparatus for welding together the ends of tubular members of weldable metal under high pressure, which comprises sectional means for longitudinally aligning said members and for re-shaping the ends thereof, and for continuously maintaining the opposed ends in abutting relation during a welding operation; sectional means for applying high pressure to the abutting ends of said members while thus aligned; sectional torch means for directing welding flames upon the outer peripheral surfaces of said members at and adjacent said abutting ends; and means concurrently effecting the retraction of the sections of each of said sectional means and the removal of all of such means as a unit from contact with the tubular members subsequent to the welding operation.

3. Apparatus for welding together the ends of tubular members of weldable metal under high pressure, which comprises sectional means for longitudinally aligning said members and for re-shaping the ends thereof; sectional means for applying high pressure to said members to maintain the opposed ends thereof in abutting relation while thus aligned; sectional torch means for directing welding flames upon the outer peripheral surfaces of said members at and adjacent said abutting ends; and means operative upon contact thereof with the tubular members being welded for causing movement of the respective sections of each of said sectional means from a retracted position laterally of the tubular members into operative position surrounding the tubular members preparatory to a welding operation.

4. Apparatus for welding together the ends of tubular members of weldable metal under high pressure, which comprises sectional means for longitudinally aligning said members and for re-shaping the ends thereof and for continuously maintaining the opposed ends in abutting relation during a welding operation; sectional means for applying high pressure to the abutting ends of said members while thus aligned; sectional means for applying heat to said members at and adjacent said abutting ends; and means operative upon contact thereof with the tubular members being welded for causing movement of the respective sections of each of said sectional means from a retracted position laterally of the tubular members into operative position surrounding the tubular members preparatory to a welding operation.

5. Apparatus for welding together the ends of tubular members of weldable metal under high pressure, which comprises sectional means for longitudinally aligning said members and for reshaping the ends thereof; sectional means for applying high pressure to said members to maintain the opposed ends thereof in abutting relation while thus aligned; sectional torch means for directing welding flames upon the outer peripheral surfaces of said members at and adjacent said abutting ends; and means concurrently effecting the retraction of the sections of each of said sectional means and the removal of all of such means as a unit from contact with the tubular members subsequent to the welding operation.

6. Apparatus for welding together the ends of tubular members of weldable metal under high pressure, which comprises sectional means for longitudinally aligning said members and for reshaping the ends thereof, and for continuously maintaining the opposed ends in abutting relation during a welding operation; sectional means for applying high pressure to the abutting ends of said members while thus aligned; sectional means for applying heat to said members at and adjacent said abutting ends; and means concurrently effecting the retraction of the sections of each of said sectional means and the removal of all of such means as a unit from contact with the tubular members subsequent to the welding operation.

7. A machine of the character described comprising a pair of spaced clamping units arranged to open and to be closed about pipes whose adjacent ends are to be welded together, each of said clamping units having pipe engaging means for gripping the corresponding pipes and pipe re-shaping means thereon, means for applying heat to the adjacent ends of the pipes in the respective clamping units, and means for relatively moving the clamping units to apply endwise force to the pipes to hold said ends in abutting relation while the heat is being applied thereto.

8. A machine of the character described comprising two pairs of pipe gripping clamps and two pairs of pipe re-shaping clamps arranged to open and close about pipes whose adjacent ends are to be welded together, means on the pipe gripping clamps for gripping the corresponding pipe, means on the pipe re-shaping clamps for re-shaping the adjacent ends of the pipe, if distorted, to approximately the same contour, means for applying heat to the adjacent ends of the pipes gripped by the respective clamps and means for relatively moving the clamps to apply endwise force to the pipes to hold said ends in abutting relation.

9. A machine of the character described comprising pipe gripping means and pipe re-shaping means arranged to be applied to pipes whose adjacent ends are to be welded together, means for applying heat to said adjacent ends of the pipe, means for actuating the gripping means to cause the same to grip the pipe, means for actuating the re-shaping means to cause the same to re-shape the pipe, if distorted, and means for relatively moving the gripping means to apply endwise force to the pipes to hold said ends in abutting relation.

10. A machine of the character described comprising pipe gripping clamps and pipe re-shaping clamps arranged to open and close about pipes whose adjacent ends are to be welded together, pipe engaging jaws on the pipe gripping clamps, pipe re-shaping members on the pipe re-shaping clamps and means arranged to be actuated by fluid under pressure for forcing said jaws and re-shaping members into contact with the pipe.

11. A machine of the character described comprising pipe gripping clamps and pipe re-shaping clamps arranged to open and close about pipes whose adjacent ends are to be welded together, pipe engaging jaws on the pipe gripping clamps, pipe engaging re-shaping members on the pipe re-shaping clamps, means arranged to be actuated by fluid under pressure for forcing said jaws and re-shaping members into contact with the pipe, means for applying heat to the adjacent ends of the pipes gripped by said respective clamps and means for relatively moving the pipe gripping clamps to apply endwise force to the pipes to hold said ends in abutting relation to allow the welding together of said abutting ends.

12. A portable machine of the character described applicable to adjacent ends of pipes to be welded together in end to end relation and bodily removable from the pipes to be positioned to perform the next succeeding welding operation, said machine comprising pipe gripping means and pipe re-shaping means arranged to open and close about the adjacent ends of pipes whose said ends are to be welded together, means for applying heat to said adjacent ends of the pipes, means for circumferentially adjusting said heat applying means to effect distribution of the heat uniformly about said ends, means for relatively moving the pipe engaging means to apply endwise force to the pipes to hold said abutting ends together under pressure while the heat is being applied to cause the welding of the ends together.

13. A machine of the character described comprising pipe gripping means arranged to close about the adjacent ends of pipes to be welded together, pipe reshaping means arranged to close about said pipes adjacent said ends and at points intermediate said pipe gripping means, means for applying said gripping and re-shaping means to the pipes and effective to cause them to close about the pipes, means for removing the gripping means and re-shaping means and effective to cause said gripping and re-shaping means to open and release the pipes.

14. A machine of the character described comprising pipe gripping means arranged to close about the adjacent ends of pipes to be welded together, pipe reshaping means arranged to close about said pipes adjacent said ends and at points intermediate said pipe gripping means, means for applying said gripping and re-shaping means to the pipes and effective to cause them to close about the pipes, means for removing the gripping means and re-shaping means and effective to cause said gripping and re-shaping means to open and release the pipes and heat applying means shaped to surround said ends of the pipes and arranged to close about the pipes upon application of the machine to the pipes and to open to release the pipes upon removal of the machine from the pipes.

15. Apparatus for welding together the ends of tubular members of weldable metal under high pressure, which comprises means for longitudinally aligning said members and for maintaining opposed ends thereof in abutting relation during a welding operation; means for applying pressure to the abutting ends of said members while thus aligned; means for applying welding heat to said members at and adjacent said abutting ends; and means, operative upon contact with the tubular members being welded, for causing movement of each of said means from a retracted position laterally of the tubular members into operative position surrounding the tubular members preparatory to a welding operation.

16. Apparatus for welding together the ends of tubular members of weldable metal under high pressure, which comprises means for longitudinally aligning said members and for maintaining opposed ends thereof in abutting relation during a welding operation; means for applying pressure to the abutting ends of said members while thus aligned; means for applying welding heat to said members at and adjacent said abutting ends; means, operative upon contact with the tubular members being welded, for causing gravity movement of each of said means from a retracted position laterally of the tubular members into operative position surrounding the tubular members preparatory to a welding operation, and means for locking the respective aligning means, pressure-applying means, and heating means in said operative position.

17. Apparatus for welding together the ends of tubular members of weldable metal, which comprises means for longitudinally aligning said members and for continuously maintaining opposed ends thereof in abutting relation during a welding operation; means for forcing the abutting ends together under high pressure while thus aligned; means for applying heat to said members at and adjacent said abutting end, the last named means being reciprocable across the interface formed by said abutting ends; and means, operative upon contact thereof with the tubular members being welded, for causing movement of said aligning means, pressure-applying means and heating means from a retracted position laterally of the tubular members into operative position surrounding the tubular member preparatory to a welding operation.

18. Apparatus for welding together the ends of tubular members of weldable metal, which comprises means for longitudinally aligning said members and for continuously maintaining opposed ends thereof in abutting relation during a welding operation; means for forcing the abutting ends together under high pressure while thus aligned; means for applying heat to said members at and adjacent said abutting ends, said heating means being oscillatable peripherally of said members; and means, operative upon contact thereof with the tubular members being welded, for causing movement of said aligning means, pressure-applying means and heating means from a retracted position laterally of the tubular members into operative position surrounding the tubular members preparatory to a welding operation.

19. Apparatus for welding together the ends of tubular members of weldable metal, which comprises means for longitudinally aligning said members and for continuously maintaining opposed ends thereof in abutting relation during a welding operation; means for forcing together the abutting ends of same members under pressure while thus aligned; means for applying heat to said members at and adjacent said abutting ends; and means for concurrently retracting the respective aligning means, pressure-applying means and heating means and removing all of such means as a unit from contact with the tubular members subsequent to a welding operation.

20. Pipe welding apparatus comprising pipe-gripping means and pipe-reshaping means respectively arranged to close about pipes to be welded together adjacent abutting ends of the pipes; means, operative upon contact with the pipes, for applying said gripping means and said reshaping means to the pipes and effective to cause them to close about the pipes; means for locking the respective pipe-gripping means and pipe-reshaping means in closed position around the pipes; and means, operative when said locking means is inoperative, for causing said gripping means and said reshaping means to release the pipes.

21. Pipe welding apparatus comprising pipe-gripping means arranged to close about the pipes adjacent abutting ends thereof to be welded together; pipe-reshaping means arranged to close about said pipes adjacent said ends and at points intermediate said pipe-gripping means; means for applying said gripping means and reshaping means to the pipes and effective to cause them to close about the pipes; means effective for causing said gripping means and reshaping means to release said pipes; heat-applying means surrounding said pipes at and adjacent said abutting ends; each of said gripping means, reshaping means, and heat-applying means being arranged to close about the pipes, upon the positioning of the welding apparatus upon the pipes, and to open to release the pipes upon removal of said apparatus from the pipes.

22. A machine of the character described comprising a pair of spaced clamping units adapted to engage pipes whose contacting ends are to be welded together, each of said clamping units having a pressure transmitting clamp adapted to grip a pipe, each of said clamping units having a pipe re-shaping clamp operatively connected with a corresponding pressure transmitting clamp, the respective pipe-re-shaping clamps of said clamping units being operatively interposed between the spaced pressure transmitting clamps; means for forcing the ends of the pipes together under pressure; and means for applying heat to the adjacent ends of the pipes.

ARTHUR L. FORBES, Jr.